June 20, 1939.　　　G. A. LYON　　　2,162,732
ORNAMENTAL BEADED WHEEL DISK
Filed Dec. 13, 1935　　　2 Sheets-Sheet 2
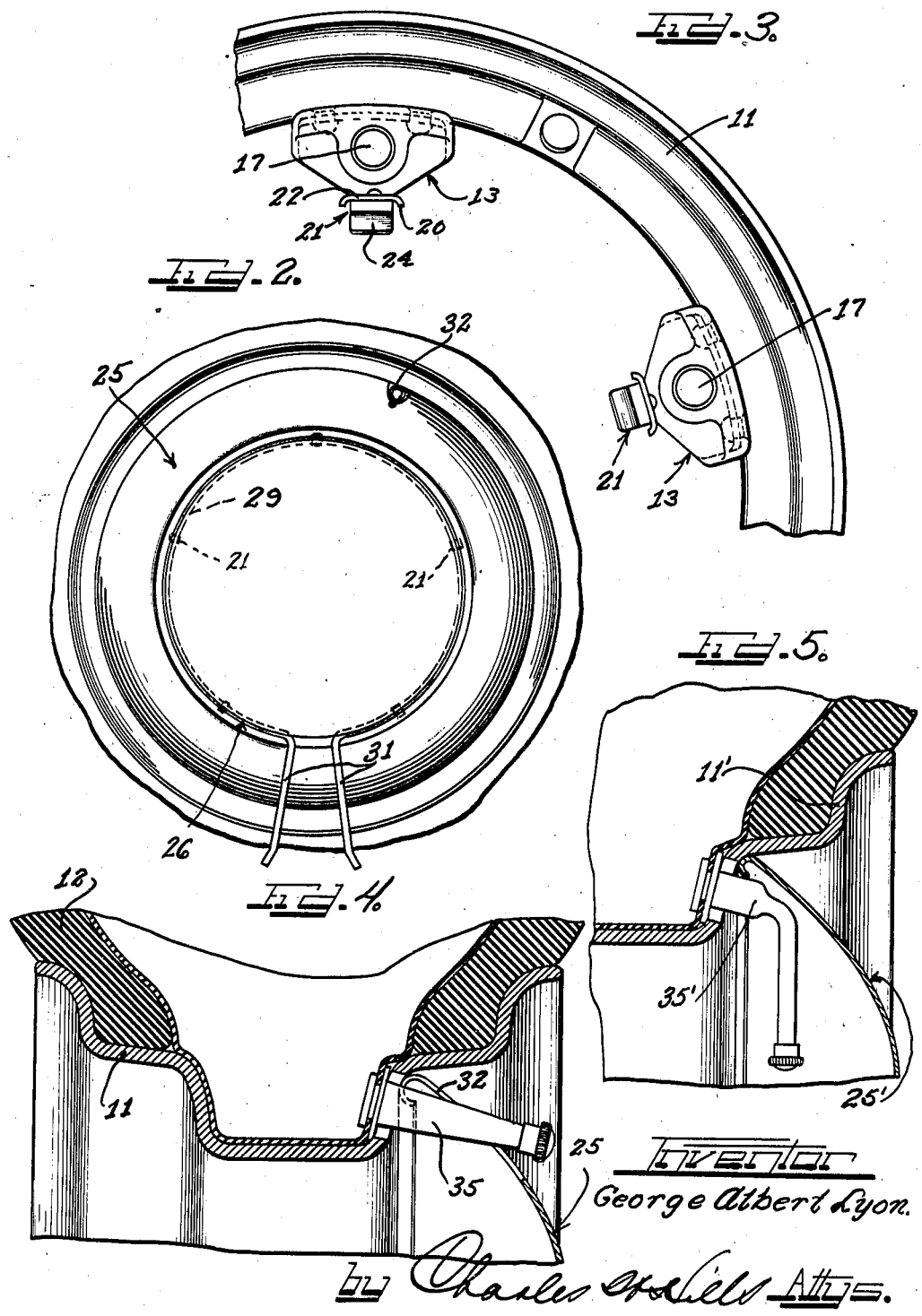

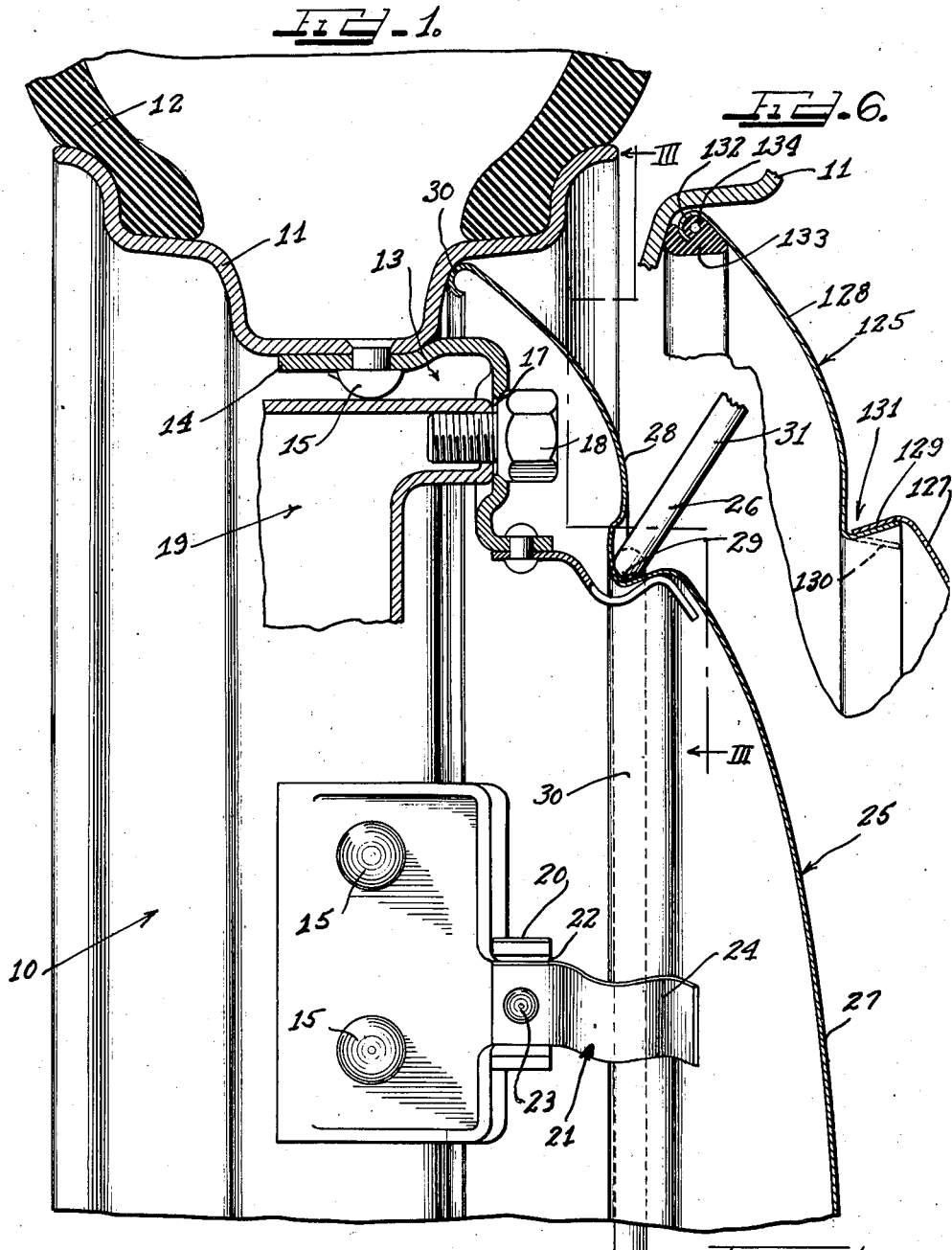

Patented June 20, 1939

2,162,732

UNITED STATES PATENT OFFICE 2,162,732

ORNAMENTAL BEADED WHEEL DISK

George Albert Lyon, Detroit, Mich.

Application December 13, 1935, Serial No. 54,161

4 Claims. (Cl. 301—37)

This invention relates to the provision of an ornamental bead in a wheel disk so formed as not only to enhance the appearance of the disk, but in addition thereto to serve as a means for securing the disk in position on the wheel, and also as a means for enabling the removal of the disk from the wheel.

An object of this invention is to provide an ornamental beaded wheel disk particularly adapted for use on the new type of automobile wheel using lateral springs for holding a cap over its outer side.

Another object of this invention is to provide a wheel disk with a bead or groove which not only enhances the appearance of the disk, but in addition thereto serves as a means for securing the disk to the wheel, and also as a means for enabling removal of the disk from the wheel.

In accordance with the general features of this invention, there is provided a beaded wheel disk of such a diameter as to enable its peripheral portion to engage guidingly an inner surface of the wheel rim, which disk is provided with an annular bead or shoulder adapted to be guided into retained engagement with cap-retaining springs on the outer side of the wheel.

Another feature of the invention relates to so forming the annular bead or shoulder on the disk that it may be engaged by a pry-off tool adapted to be used to bodily force the disk out of retained engagement with the retaining springs in the wheel.

Other objects and features will be more fully apparent from the following detailed description taken in connection with the accompanying drawings which illustrate several embodiments of the invention, and in which:

Figure 1 is a fragmentary sectional view taken through a wheel and a disk applied thereto embodying my invention, and also showing fragmentarily the pry-off tool;

Figure 2 is a fragmentary front view of the structure shown in Figure 1 on a reduced scale, and also showing clearly the pry-off tool;

Figure 3 is a fragmentary detail view taken on substantially the line III—III of Figure 1, looking toward the wheel;

Figure 4 is a fragmentary cross-sectional view taken through the construction shown in Figure 1 at the location of the valve stem;

Figure 5 is a sectional view somewhat similar to Figure 4, but illustrating a modification of the invention in which the valve stem is disposed wholly behind the disk and does not project through a slot in the peripheral portion of the disk, as shown in Figure 4; and Figure 6 is a fragmentary sectional view showing a modified form of disk for cooperation with the wheel structure shown in Figure 1, only a portion of the rim of the wheel being shown in this figure.

The reference character 10 designates generally a wheel to which my novel disk is adapted to be applied, and which wheel includes a conventional drop center tire rim 11 adapted to receive and support a tire 12.

Connected to an inner surface of the base of this tire rim 11 are a plurality of right-angular members 13 which are preferably five in number. Since these five members are identical, a description of one will suffice for all. Each of these members 13 has a transverse leg 14 secured by any suitable means, such for example as rivets 15, to the base of the tire rim 11.

The other leg 16 of this member is provided with a bolt hole 17 through extends a conventional bolt 18 for securing the wheel to a conventional axle part, such for example as a drum 19 or the like. The leg 16 has its free edge provided with a turned lug 20 which provides a seat for, and is adapted to have secured thereto, a cap-retaining spring 21. The seat for the spring is provided by depressing an intermediate section 22 of the lug 20, as will be evident from Figure 1. One end of the resilient spring 21 is secured by means of a rivet 23 to this lug 20. The other or free end 24 of this spring is bent into an S-like shape so as to be capable of yieldably holding a disk or closure cap in position on the outer side of the wheel.

My present invention is directed primarily to the provision of a novel disk or closure cap 25 for cooperation with the cap-retaining springs 21, and also to providing novel means for prying the disk loose from the retaining springs. The pry-off tool is designated generally by the reference character 26, and will be described hereinafter.

The disk 25 has a central crown portion 27 which may be shaped or otherwise ornamented to simulate a conventional hub cap. The disk also includes an outer annular concavo-convex section or portion 28 which is connected to the crown portion 27 by a reentrant groove section 29. The outer periphery of the disk is formed into a turned edge 30 which is adapted to engage slidingly a flange of the tire rim as the disk is moved axially into position on the outer side of the wheel. The disk may, for example, have a diameter which is a sixteenth of an inch less than that of the flange which it is adapted to engage, so as to admit of the turned edge being sufficiently close to the flange to aid in the centering of the disk with respect to the springs 21 to be engaged by the disk.

The disk 25 may be made of any suitable material, but is preferably made of metallic sheet. I have obtained excellent results by forming this disk in accordance with the teaching of my copending application Serial No. 13,814, filed March 30, 1935, entitled "Method of and apparatus for die-forming parts".

If the disk 25 is manufactured in accordance with the teachings of my copending application, the reentrant groove is caused to be formed in the disk by subjecting the disk to endwise compressive force which causes the intermediate section 29 to be deflected to assume the groove-like formation disclosed herein.

The groove section 29 results in the disk on the interior of the crown portion 27 having an annular flange 30 adapted to be engaged by the springs 21, and over which the free ends 24 of the springs 21 are adapted to ride as the disk is shoved axially into position on the outer side of the wheel. As pointed out hereinbefore, the outer edge of the disk is of such a diameter as to engage slidingly the rim of the wheel for guiding the disk into engagement with the retaining springs 21.

Now, in order to enable this disk to be removed without the same being marred, I have found it necessary to provide a special pry-off tool 26. This tool is in the form of a contractible and expansible split ring having its free ends 31 extending at an angle to the ring proper and the groove section 29 so as to form a handle by means of which the ring may be contracted into clamped engagement with the groove section 29, or may be expanded out of such clamped engagement.

This pry-off ring 26 is easily applied by pushing it axially over the rim of the hub portion 27 into the groove section 29. Thereafter the ends 31 are grasped by the operator and pressed together so as to clamp the ring tightly in position on the disk. The disk may thereafter be easily removed by merely jerking it loose from the retaining springs 21.

It will also be noted that in one form of my invention, as best shown in Figures 2 and 4, the disk 25 is notched at 32 in its outer periphery in order to permit the valve stem 35 to project therethrough. In this form of the invention, the valve stem is accessible without requiring the removal of the disk from the wheel.

In a modification of the invention, shown in Figure 5, the disk 25' does not have a notch in its outer periphery, but is so formed as to conceal the valve stem 35' as well as the bolts for securing the wheel to the drum. In this form of the invention, an angular valve stem 35' is used, so that the valve stem can extend down behind the inner surface of the disk 25'.

In Figure 6, I have illustrated a still further form of the invention, in which a disk 125 is made up of two parts, namely, a crown part 127 and an outer concavo-convex part 128.

This form of the invention is not fabricated in accordance with the teaching of my copending application from a single blank of material, but on the contrary, is made from a disk which forms the crown part and a ring which forms the part 128.

The crown part 127 is blanked on suitable equipment into a hollow member similar in shape to that of the portion 27 of the first-described form of the invention. In this condition, the part 127 has an inwardly turned inclined edge portion 129.

The part 128 is formed into a concavo-convex ring having its inner edge turned to a position such as that indicated by dotted lines at 130 in Figure 6. The part 127 is then fitted over the turned edge 130, or in other words, the part 127 is telescoped by the flange 130 on the other part 128. The two parts are then interlocked by deflecting the turned flange 130 into the full line position as shown in Figure 6. When thus connected, the two parts nevertheless cooperate to provide a reentrant groove section indicated at 131, which is engageable by the pry-off tool of my invention.

Also, the outer periphery of the disk 125 may be formed into a turned edge 132 which has secured to it a ring of rubber 133 for engaging the flange of the wheel rim 11. A spring wire 134 may be disposed in the rubber ring 133 for aiding in retaining the ring in tight cooperation with the inner surface of the turned edge 132 of the disk. Thus, in this form of the invention, I have also provided for a cushioned contact between the outer periphery of the disk and the wheel rim. This contact, however, does not interfere with the guiding action previously described in connection with the preferred form of the invention.

Now, I desire it understood that while I have illustrated and described in detail a number of forms of my invention, the invention is not to be thus limited, but only in so far as defined by the scope and spirit of the appended claims.

I claim as my invention:

1. An ornamental wheel disk provided with a central crown portion, an outer marginal portion, and an intermediate annular reentrant groove for enhancing the appearance of the disk and for providing the disk with a rearwardly projecting concealed annular flange adapted to be engaged by resilient disk-retaining means, said flange extending axially and radially inward between the outer edge of the crown portion and the inner edge of said outer portion, said disk having its outer peripheral portion formed into a turned edge and being of such a diameter as to engage guidingly the rim of the wheel for guiding the disk into engagement with retaining means on the wheel.

2. An ornamental wheel disk provided with a central crown portion, an outer marginal portion, and an intermediate annular reentrant groove for enhancing the appearance of the disk and for providing the disk with a rearwardly projecting concealed annular flange adapted to be engaged by disk-retaining means, said flange extending axially and radially inward between the outer edge of the crown portion and the inner edge of said outer portion, said reentrant groove also including a wall portion extending radially outwardly from the axially inner edge of said flange, said wall portion and said flange portion being arranged to provide a seat for receiving and accommodating a clamping ring manually operable to pry the disk from the disk retaining means on the wheel.

3. An ornamental wheel disk provided with a central crown portion, an outer curved marginal portion, and an intermediate annular reentrant groove for enhancing the appearance of the disk and for providing the disk with a rearwardly projecting annular flange adapted to be engaged by resilient disk-retaining means, said flange extending axially and radially inward between the outer edge of the crown portion and the inner edge of said outer portion, said disk having its outer peripheral portion formed into a turned edge and being of such a diameter as to engage guidingly the rim of the wheel for guiding the disk into engagement with retaining means on the wheel, said crown portion and said curved marginal portion of said disk including telescoping portions clinched together to form said groove and flange.

4. An ornamental wheel disk provided with a central crown portion, an outward curved marginal portion and an intermediate annular reentrant groove for enhancing the appearance of the disk and for providing the disk with a laterally projecting concealed outer flange adapted to be secured by disk retaining means on a wheel, said annular reentrant groove being provided by an inwardly converging conical wall portion and a substantially radial wall portion extending from the rear edge of said conical portion, said wall portions diverging at a wide angle and providing a seat for receiving and accommodating a clamping ring manually operable to pry the disk from the disk retaining means on the wheel.

GEORGE ALBERT LYON.